Patented Jan. 2, 1923.

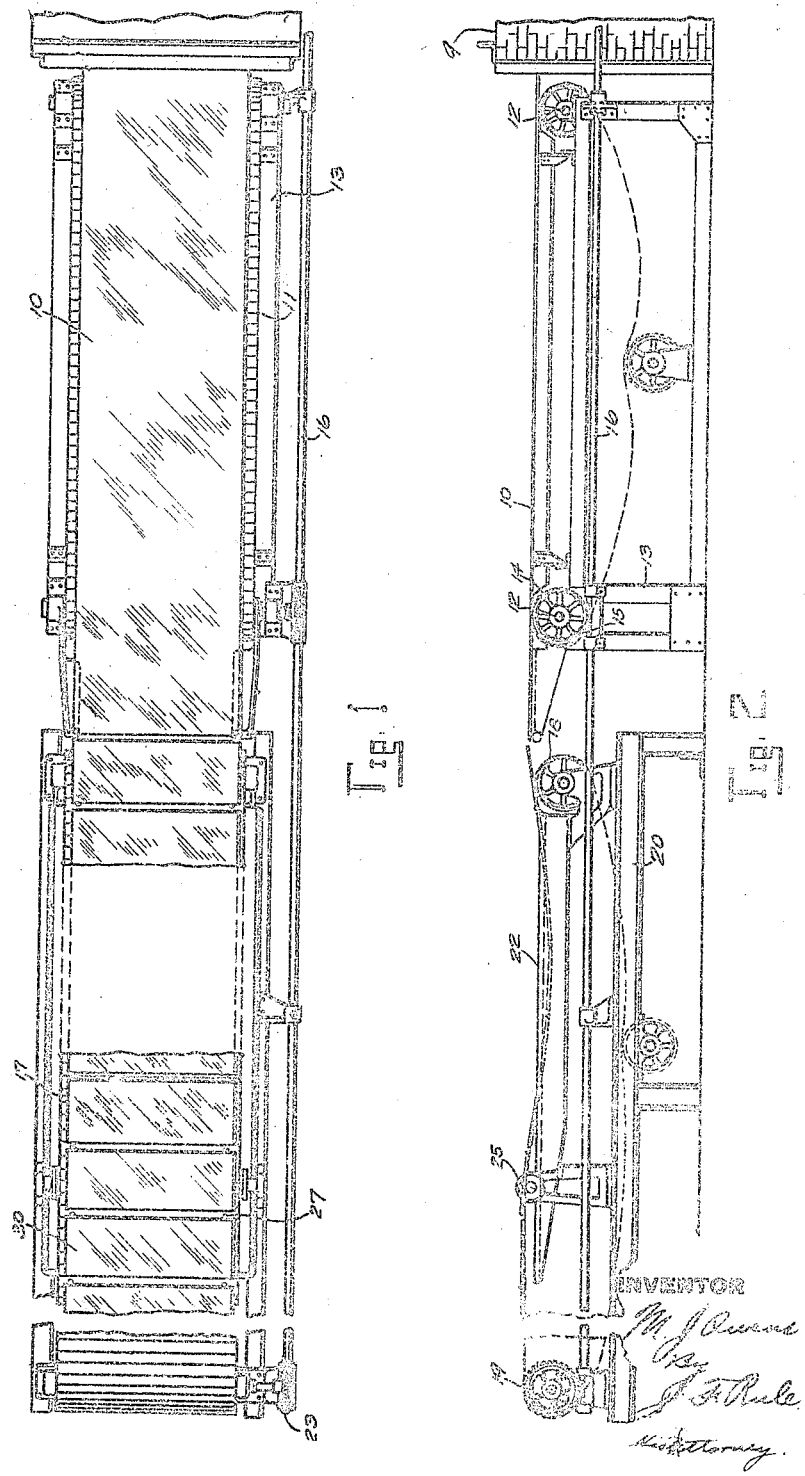

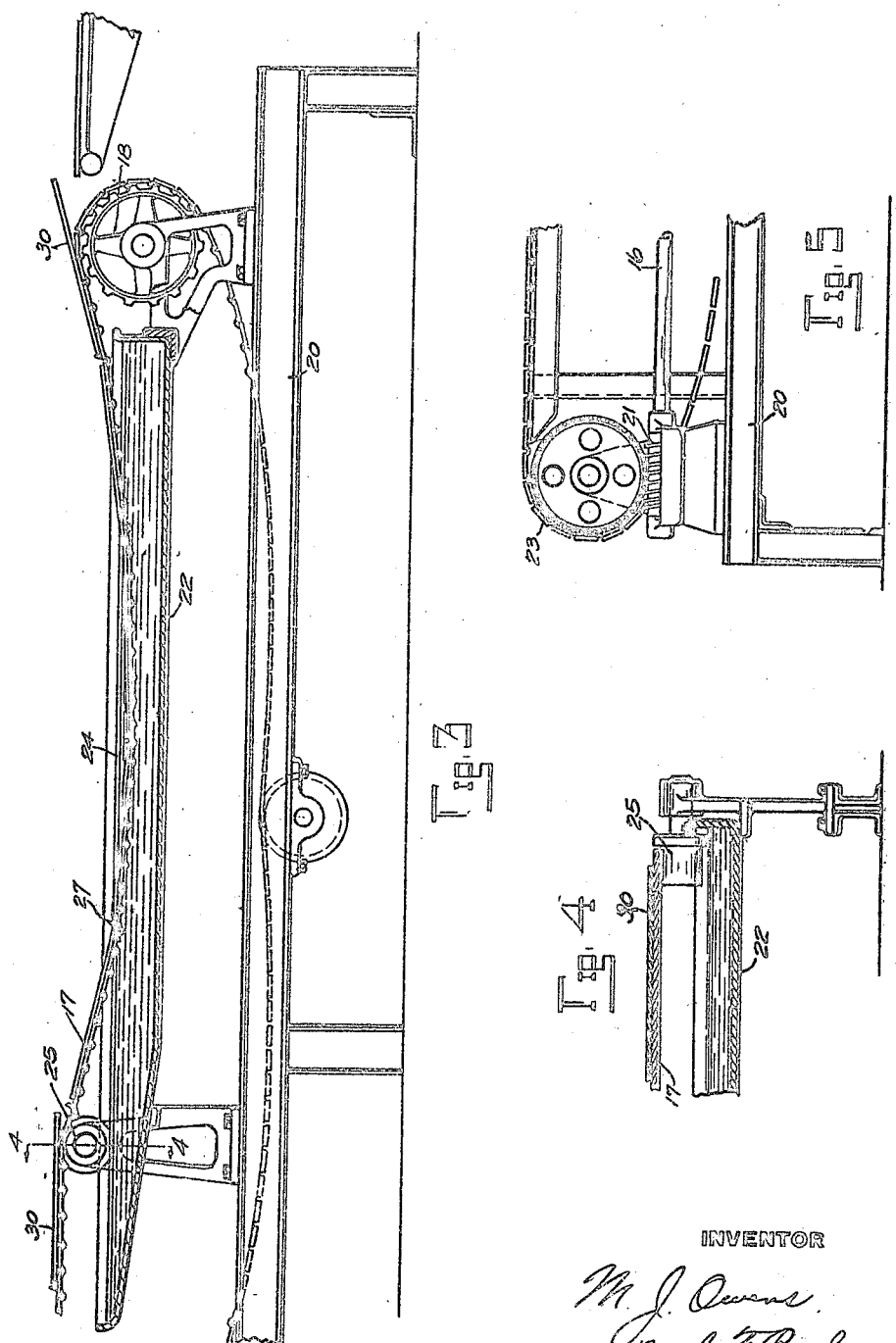

1,440,408

UNITED STATES PATENT OFFICE.

MICHAEL J. OWENS, OF TOLEDO, OHIO, ASSIGNOR TO THE LIBBEY OWENS SHEET GLASS COMPANY, OF TOLEDO, OHIO, A CORPORATION OF OHIO.

MEANS FOR TREATING SHEET GLASS.

Application filed June 7, 1919, Serial No. 302,544. Renewed October 21, 1922. Serial No. 596,177.

*To all whom it may concern:*

Be it known that I, MICHAEL J. OWENS, a citizen of the United States, residing at Toledo, in the county of Lucas and State of Ohio, have invented new and useful Improvements in Means for Treating Sheet Glass, of which the following is a specification.

My invention relates to means for treating sheet glass in an acid bath and particularly to means for giving such treatment as a step in the method of making glass wherein the glass is drawn in a continuous sheet. It is customary in the manufacture of window glass to dip the sheets of glass into a bath of acid or suitable liquid for removing impurities and clearing the surface of the glass. In accordance with the present invention, the glass which has been drawn from a pool of molten glass and passed in a continuous sheet through an annealing leer, is carried by an endless conveyor through an acid bath either before or after the sheet is cut into sections.

In the accompanying drawings, which illustrate a construction embodying the principles of my invention:

Figure 1 is a plan view of the apparatus.

Figure 2 is an elevation of the same.

Figure 3 is a sectional elevation on a larger scale taken longitudinally through the bath.

Figure 4 is a fragmentary sectional view taken at the line 4—4 on Figure 3.

Figure 5 is a detail showing means for driving the conveyor.

The glass may be formed in a well known manner by drawing it in a continuous sheet from a pool of molten glass, the sheet being passed horizontally through an annealing oven or leer 9. As the sheet of glass 10 emerges from the leer it continues its horizontal travel over a drawing table or endless conveyor 11, the latter running on sprockets or rolls on shafts 12 at the ends of a supporting frame 13. The conveyor 11 may be driven by a worm 15 meshing with a worm wheel 14 on the forward shaft 12, the worm 15 being carried on a drive shaft 16.

Beyond the conveyor or table 11 is another endless conveyor 17 running on rolls or sprockets 18, 19, supported on a frame 20. The roll 19 may be driven by a worm wheel 23 and a worm 21 on the drive shaft 16. A receptacle or tray 22 beneath the upper lead of the conveyor and extending lengthwise thereof, contains a liquid 24 in which the glass is immersed as it is carried by the conveyor. This may be an acid bath such as is commonly used for treating window or sheet glass for removing impurities from the surface thereof. The conveyor 17 sags by its own weight and the weight of the glass thereon sufficiently to immerse the glass. After passing through the bath, the glass moves upward in an inclined direction above the surface of the liquid, permitting drainage before it passes beyond the end of the tray. The glass may pass in a continuous sheet through the bath, but is preferably cut transversely into individual sheets or sections 30 before entering the bath. The cutting is ordinarily done by hand as the glass passes over the table 11, or may be done by automatic machinery. Guide rolls 25 may be positioned intermediate the rolls 18 and 19 to support the conveyor 17 and the glass thereon. The conveyor 17 may be provided with studs or projections 27 at regular intervals to project upwardly between the individual sections of glass, thus serving as a positive means for advancing the glass with the conveyor and preventing overlapping of the sections.

Variations may be resorted to within the spirit and scope of my invention.

What I claim is:

1. The combination with means to continuously advance an endless sheet of glass horizontally through a leer, a receptacle to contain a liquid positioned beyond the leer and means for causing the glass to travel through the liquid.

2. The combination with means to continuously advance an endless sheet of glass horizontally through a leer, of a horizontal support over which a sheet of glass is continuously advanced from the leer, a traveling support located beyond the first mentioned support in substantial alignment therewith, and a bath beneath said traveling support through which the latter with the glass thereon is caused to pass.

Signed at Toledo, in the county of Lucas and State of Ohio, this 3rd day of June, 1919.

MICHAEL J. OWENS.